United States Patent
Kim et al.

(10) Patent No.: US 10,749,147 B2
(45) Date of Patent: Aug. 18, 2020

(54) POUCH FORMING DEVICE AND METHOD AND FACILITY FOR PRODUCING SECONDARY BATTERY COMPRISING THE POUCH FORMING DEVICE

(71) Applicant: LG Chem, Ltd., Seoul (KR)

(72) Inventors: Gee Hwan Kim, Daejeon (KR); Sang Don Lee, Daejeon (KR); Min Seung Choi, Daejeon (KR); Sang Uk Yeo, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/281,669

(22) Filed: Feb. 21, 2019

(65) Prior Publication Data
US 2020/0168853 A1 May 28, 2020

(30) Foreign Application Priority Data
Nov. 23, 2018 (KR) .................. 10-2018-0146357

(51) Int. Cl.
*H01M 2/02* (2006.01)
(52) U.S. Cl.
CPC ................. *H01M 2/0217* (2013.01)
(58) Field of Classification Search
CPC ......... B29C 43/00–58; B29C 2043/022–5891; B65B 3/022
See application file for complete search history.

(56) References Cited

U.S. PATENT DOCUMENTS

| 5,692,405 A | 12/1997 | Kirii |
| 2014/0260495 A1* | 9/2014 | Kohno ................. B21D 22/20 72/347 |

(Continued)

FOREIGN PATENT DOCUMENTS

| CN | 1114599 A | 1/1996 |
| CN | 101259498 A | 9/2008 |
| CN | 201744566 U | 2/2011 |

(Continued)

OTHER PUBLICATIONS

Chinese Office Action for Application No. 201910127977.2 dated Jan. 2, 2020. 5 pages.

(Continued)

*Primary Examiner* — Stephan J Essex
(74) *Attorney, Agent, or Firm* — Lerner, David, Littenberg, Krumholz & Mentlik, LLP

(57) ABSTRACT

A pouch forming device is provided. The pouch forming device comprises a die member including a die on which a pouch film is disposed on a top surface thereof, in which a forming part is formed, and a die holder to which the die is fixed, a stripper member that presses and fixes the pouch film disposed on the die when descending and a first driving piece to move the stripper vertically, a punch member including a punch plate comprising a punch configured to be inserted into the forming part to form an electrode assembly accommodation part in the pouch film and a second driving piece to move the punch plate vertically, and a control member that controls the first driving piece to allow the stripper to ascend when the punch is inserted into the forming part to decrease a pressing force applied to the pouch film.

10 Claims, 13 Drawing Sheets

(56) References Cited

U.S. PATENT DOCUMENTS

| | | | |
|---|---|---|---|
| 2016/0221068 A1 | 8/2016 | Tanaka et al. | |
| 2017/0095860 A1 | 4/2017 | Nakatani | |

FOREIGN PATENT DOCUMENTS

| | | | | |
|---|---|---|---|---|
| CN | 105682819 A | | 6/2016 | |
| JP | S56119632 A | | 9/1981 | |
| JP | S62218113 A | | 9/1987 | |
| JP | H0631352 A | * | 2/1994 | ............. B21D 28/00 |
| JP | H11-239999 A | | 9/1999 | |
| JP | 2002050326 A | | 2/2002 | |
| JP | 2004146252 A | | 5/2004 | |
| JP | 2012113993 A | | 6/2012 | |
| JP | 2014-083573 A | | 5/2014 | |
| JP | 2017070975 A | * | 4/2017 | ............... B22F 3/03 |
| JP | 2017070975 A | | 4/2017 | |
| KR | 10-199-0046902 | | 7/1999 | |
| KR | 20040060273 A | * | 7/2004 | ............. H01M 2/02 |
| KR | 10-2006-0011428 A | | 2/2006 | |
| KR | 10-2008-0081845 A | | 9/2008 | |
| KR | 20130017102 A | * | 2/2013 | ............. C21D 1/185 |
| KR | 10-2014-0019933 A | | 2/2014 | |
| KR | 20160054860 A | * | 5/2016 | ............. B29C 43/20 |
| KR | 10-2017-0037016 A | | 4/2017 | |
| KR | 20170124882 A | | 11/2017 | |
| KR | 10-1904094 B1 | | 10/2018 | |
| WO | 2015/045797 A1 | | 4/2015 | |
| WO | WO-2015045797 A1 | * | 4/2015 | |
| WO | 2016/006403 A1 | | 1/2016 | |

OTHER PUBLICATIONS

European Search Report corresponding to European Patent Application No. 19157527.3 dated Sep. 30, 2019 (7 pages).

\* cited by examiner

| PUNCH DEPTH (mm) | WHETHER CRACK OCCURS | |
|---|---|---|
| | COMPARATIVE EXAMPLE | MANUFACTURING EXAMPLE |
| 7 | ● | ○ |
| 8 | ● | ○ |
| 9 | ● | ○ |
| 10 | ● | ● |
| 11 | ● | ● |
| 12 | ● | ● |
| 13 | ● | ● |

● OCCURRENCE OF CRACK
○ NON-OCCURRENCE OF CRACK

FIG.11

POUCH FORMING DEVICE AND METHOD AND FACILITY FOR PRODUCING SECONDARY BATTERY COMPRISING THE POUCH FORMING DEVICE

CROSS-REFERENCE TO RELATED APPLICATIONS

The present application claims the benefit of the priority of Korean Patent Application No. 10-2018-0146357 filed on Nov. 23, 2018, which is hereby incorporated by reference in its entirety.

BACKGROUND

Field of the Invention

The present invention relates to a pouch forming device and method and a facility for producing a secondary battery, which comprises the pouch forming device, and more particularly, to a pouch forming device and method, in which, when a pouch is formed, an elongation is gradually increased to prevent cracks from occurring, and a facility for producing a secondary battery, which comprises the pouch forming device.

Description of the Related Art

In general, secondary batteries are chargeable and dischargeable unlike primary batteries that are not chargeable and are widely used in electronic devices such as mobile phones, notebook computers, camcorders, and the like, or electric vehicles and the like.

Such a secondary battery comprises an electrode assembly comprising an electrode tab, an electrode lead coupled to the electrode tab, and a battery case that accommodates the electrode assembly with a front end of the electrode lead protruding to the outside.

The battery case comprises an accommodation part that accommodates the electrode assembly and a sealing part formed along an edge surface of the accommodation part to seal the accommodation part. A device for forming the battery case comprises a die on which a battery film is disposed, a stripper that fixes the battery film disposed on the die, and a punch that presses a surface of the battery film disposed on the die to form the electrode assembly accommodation part in the battery film.

However, in the above-described device for forming the battery case, when the battery film is formed, cracks occur at locations such as a vertex portion of the accommodation part.

SUMMARY

An aspect of the present invention provides a pouch forming device and method, in which, when a pouch film is pressed to form an accommodation part that accommodates an electrode assembly, a stripper that fixes the pouch film gradually decreases a pressing force, and thus, the pouch film gradually increases elongation to stably form the accommodation part and also prevent cracks from occurring at locations, e.g., a vertex portion of the accommodation part, and a facility for producing a secondary battery, which comprises the pouch forming device.

According to an aspect of the present invention, a pouch forming device may comprise a die member provided with a die on which a pouch film is disposed on a top surface thereof, in which a forming part is formed, and a die holder to which the die is fixed; a stripper member including a stripper disposed on an upper portion of the die member to be vertically movable to press and fix the pouch film disposed on the die when descending and a first driving piece to move the stripper vertically; a punch member including a punch plate comprising a punch disposed on the upper portion of the die member to be vertically movable and configured to be inserted into the forming part when descending to form an electrode assembly accommodation part in the pouch film and a second driving piece to move the punch plate vertically; and a control member that controls the first driving piece to allow the stripper to ascend when the punch is inserted into the forming part to press the pouch film to decrease a pressing force applied to the pouch film.

The control member may control the first driving piece to allow the stripper to gradually ascend to gradually decrease the pressing force of the pouch film. The control member may allow the stripper to ascend to be separated from the pouch film when the punch is completely inserted into the forming part to remove the pressing force applied to the pouch film. The control member may comprise a sensor that detects insertion of the punch into the forming part and a controller that controls the driving piece in response to a signal from the sensor to allow the stripper to gradually ascend.

The first driving piece may comprise a plurality of moving rods connected to the stripper by passing through a top surface of the punch plate to allow the stripper to vertically move, a connection bar to which the plurality of moving rods disposed on an upper portion of the punch plate are fixed and which allows the plurality of moving rods to vertically move simultaneously, and a cylinder that allows the connection bar to vertically move.

The control member may further control the second driving piece to reduce a descending speed of the punch plate on which the punch is disposed when the punch is inserted into the forming part to press the pouch film. The control member may control the second driving piece to gradually reduce the descending speed of the punch plate on which the punch is disposed. Further, the control member may control the first driving piece and the second driving piece simultaneously to allow the stripper to gradually ascend and allow the descending speed of the punch plate to gradually decrease.

According to another aspect of the present invention, a pouch forming method may comprise a disposition step of disposing a pouch film on a top surface of a die member including a forming part; a pressing step of pressing the pouch film disposed on the top surface of the die member with a stripper member to fix an edge surface of the pouch film; a forming step of inserting a punch into the forming part to form an electrode assembly accommodation part in a surface of the pouch film; and a control step of gradually reducing a pressing force of the stripper member to gradually decrease the pressing force applied to the pouch film when the punch is inserted into the forming part to press the pouch film.

The control step may comprise a first control process of outputting an insertion signal when the punch is inserted into the forming part and a second control process of gradually reducing the pressing force applied to the pouch film when the insertion signal is outputted. The control step may further comprise a third control process of gradually reducing a descending speed of the punch when the insertion signal is outputted to gradually decrease the pressing force applied to the pouch film through the punch.

According to another aspect of the present invention, a facility for producing a secondary battery may comprise a pouch forming device that forms a pouch film to manufacture a pouch in which an electrode assembly accommodation part is formed. The pouch forming device may comprise a die member including a die on which a pouch film is disposed on a top surface thereof, in which a forming part is formed, and a die holder to which the die is fixed; a stripper member including a stripper disposed on an upper portion of the die member to be vertically movable to press and fix the pouch film disposed on the die when descending, and a first driving piece to move the stripper vertically; a punch member including a punch plate comprising a punch disposed on the upper portion of the die member to be vertically movable and configured to be inserted into the forming part when descending to form an electrode assembly accommodation part in the pouch film, and a second driving piece to move the punch plate vertically; and a control member that controls the first driving piece to allow the stripper to ascend when the punch is inserted into the forming part to press the pouch film to decrease a pressing force applied to the pouch film. The control member may control the second driving piece to gradually reduce a descending speed of the pouch plate on which the punch is disposed when the punch is inserted into the forming part to press the pouch film.

According to an aspect of the present invention, a pouch forming device may comprise a die member including a die on which a pouch film is disposed on a top surface thereof, in which a forming part is formed, and a die holder to which the die is fixed; a stripper member including a stripper disposed on an upper portion of the die member to be vertically movable to press and fix the pouch film disposed on the die when descending, and a first driving piece to move the stripper vertically; a punch member including a punch plate comprising a punch disposed on the upper portion of the die member to be vertically movable and configured to be inserted into the forming part when descending to form an electrode assembly accommodation part in the pouch film, and a second driving piece to move the punch plate vertically; and a control member that controls the second driving piece to reduce a descending speed of the punch plate on which the punch is disposed when the punch is inserted into the forming part to press the pouch film. The control member may control the second driving piece to gradually reduce the descending speed of the punch plate on which the punch is disposed.

BRIEF DESCRIPTION OF THE DRAWINGS

The above and other aspects, features and other advantages of the present invention will be more clearly understood from the following detailed description taken in conjunction with the accompanying drawings, in which:

FIG. 11 is a table showing an experimental example of the pouch forming device according to the first exemplary embodiment of the present invention;

DETAILED DESCRIPTION

Figure 1:
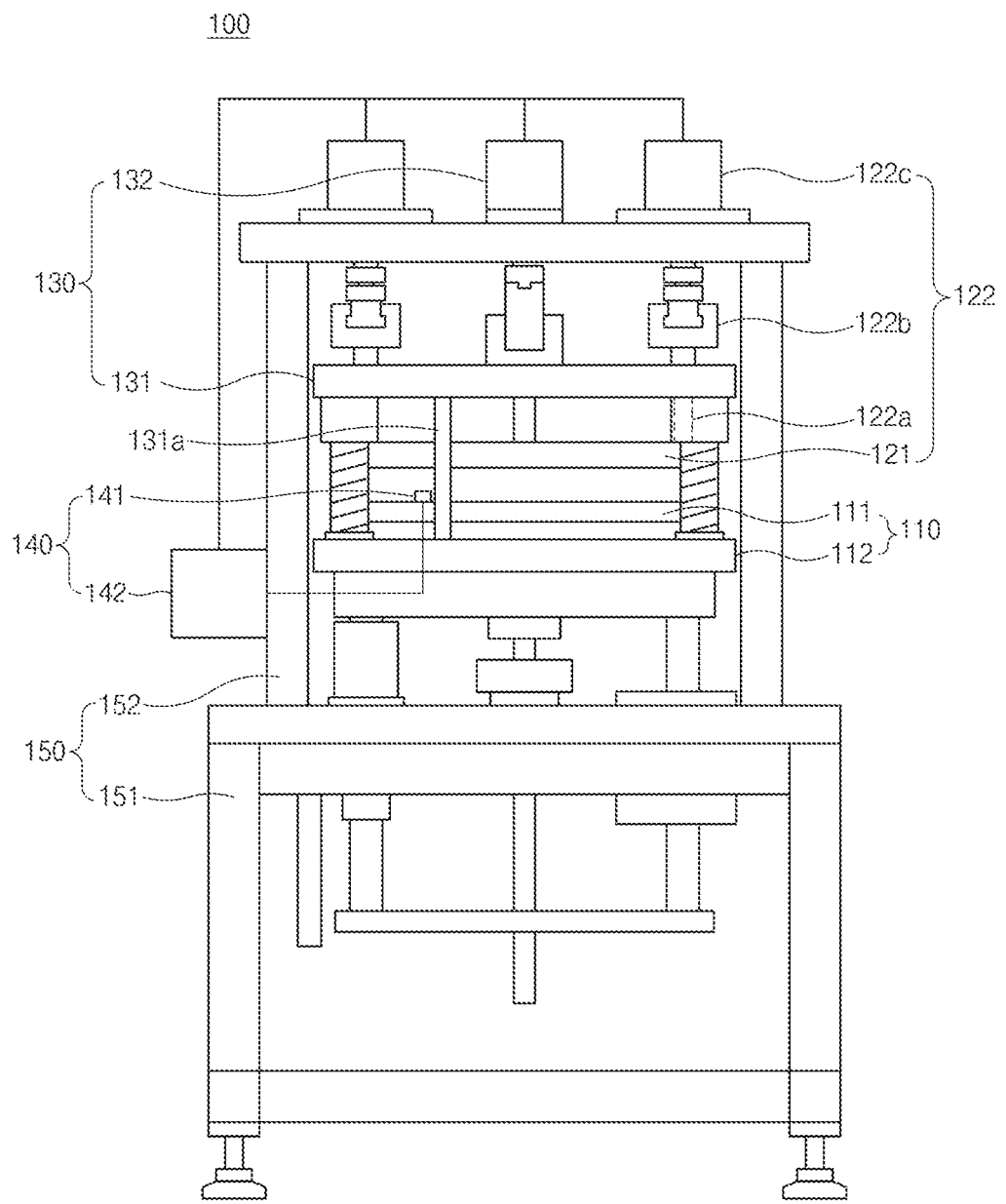
FIG. 1 is a schematic side view of a pouch forming device according to a first exemplary embodiment of the present invention.

Hereinafter, exemplary embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the exemplary embodiments set forth herein. In the drawings, anything unnecessary for describing the present invention will be omitted for clarity, and also like reference numerals in the drawings denote like elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

[Pouch]

Figure 10:
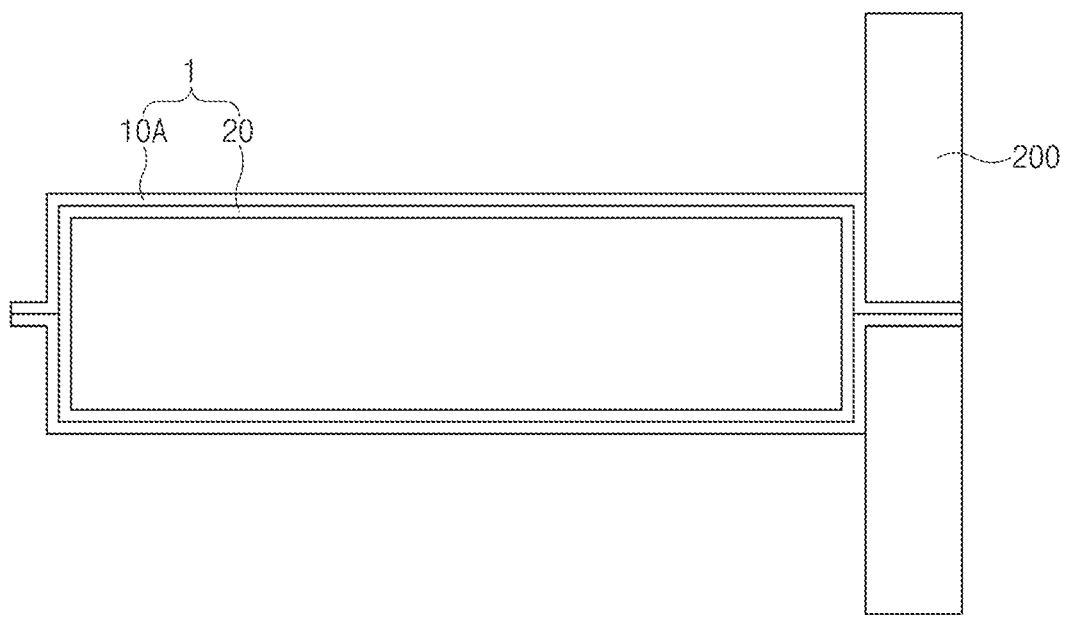
FIG. 10 is a view illustrating a sealing device of a facility for producing a secondary battery according to a second exemplary embodiment of the present invention.
Figure 12:
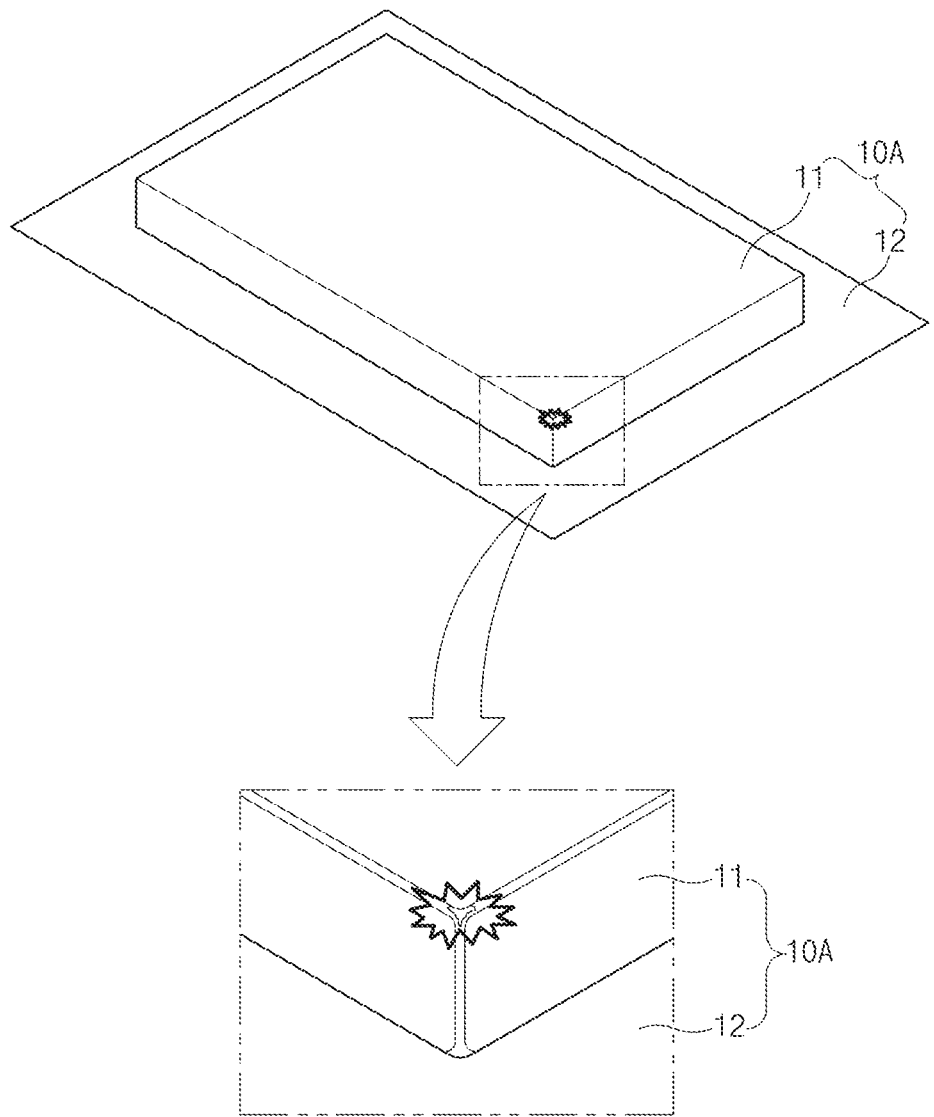
FIG. 12 is a perspective view of a pouch manufactured according to a comparative example in the experimental example of the pouch forming device according to the first exemplary embodiment of the present invention.
Figure 13:
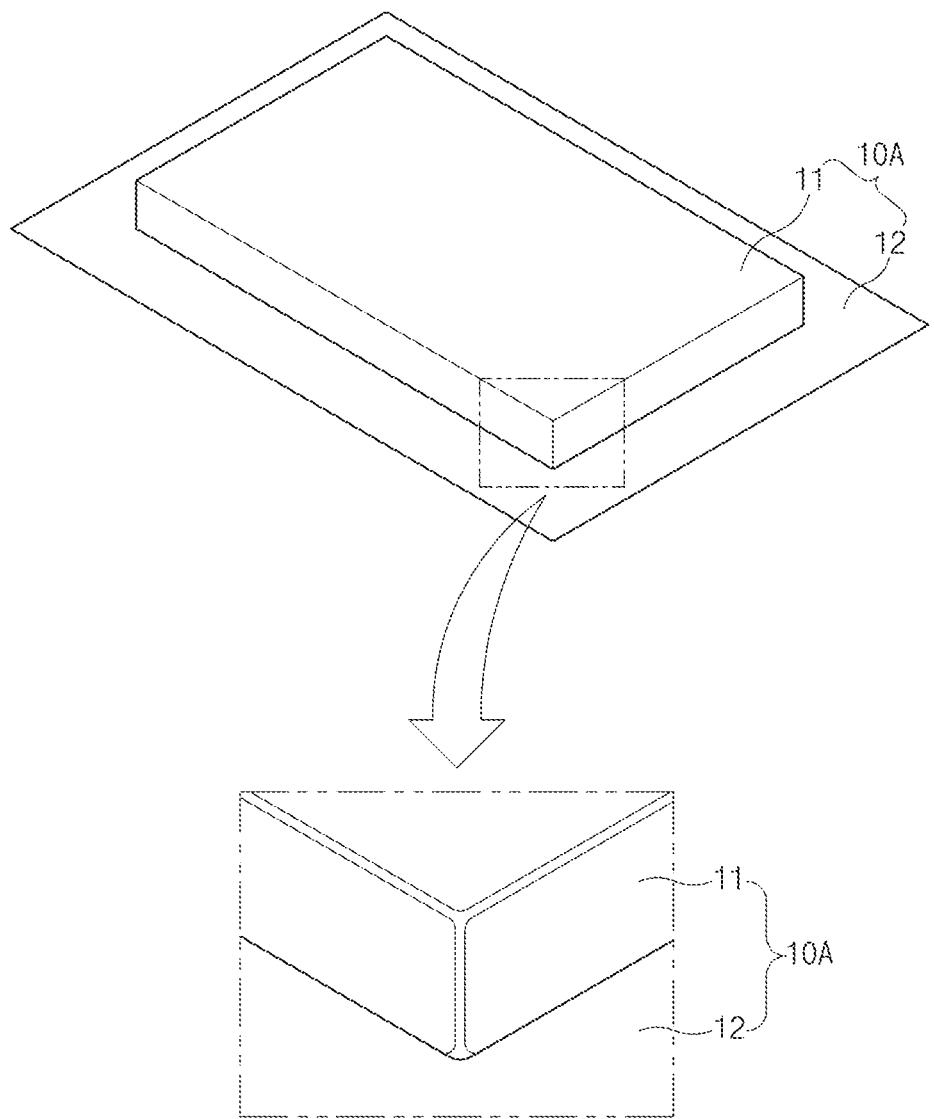
FIG. 13 is a perspective view of a pouch manufactured according to a manufacturing example in the experimental example of the pouch forming device according to the first exemplary embodiment of the present invention.

Referring to FIGS. 10, 12, and 13, a pouch 10A is configured to accommodate an electrode assembly and comprises an electrode assembly accommodation part 11 that accommodates the electrode assembly 20 and a sealing part 12 that seals the electrode assembly accommodation part 11. The pouch 10A having the above-described structure may be formed using a pouch forming device according to the present invention. In particular, the pouch forming device according to the present invention may press one surface of a pouch film having a predetermined area to form the electrode assembly accommodation part 11 and bend the other surface of the pouch film to overlap the electrode assembly accommodation part, thereby manufacturing the pouch 10A.

In the pouch forming device according to the present invention, when the pouch film is pressed to form the electrode assembly accommodation part, the pressing force for fixing the pouch film may be gradually decreased. Thus, when the electrode assembly accommodation part is formed, elongation may be gradually increased to form the electrode assembly accommodation part without an occurrence of cracks at a local portion (e.g., an extreme end), i.e., an edge or vertex portion of the electrode assembly accommodation part.

Hereinafter, the pouch forming device according to the present invention will be described in detail with reference to the accompanying drawings.

[Pouch Forming Device According to First Exemplary Embodiment of the Present Invention]

As illustrated in FIGS. 1 to 6, a pouch forming device 100 according to a first exemplary embodiment of the present invention may comprise a die member 110 on which a pouch film 10 is disposed, a stripper member 120 that presses the pouch film 10 disposed on the die member 110 to fix the pouch film 10, a punch member 130 that presses the pouch film 10 disposed on the die member 110 to form an electrode assembly accommodation part, and a control member 140 that reduces a pressing force of the stripper member 120 when the punch member 130 presses the pouch film 10 to increase elongation of the pouch film 10.

Die Member

Figure 2:
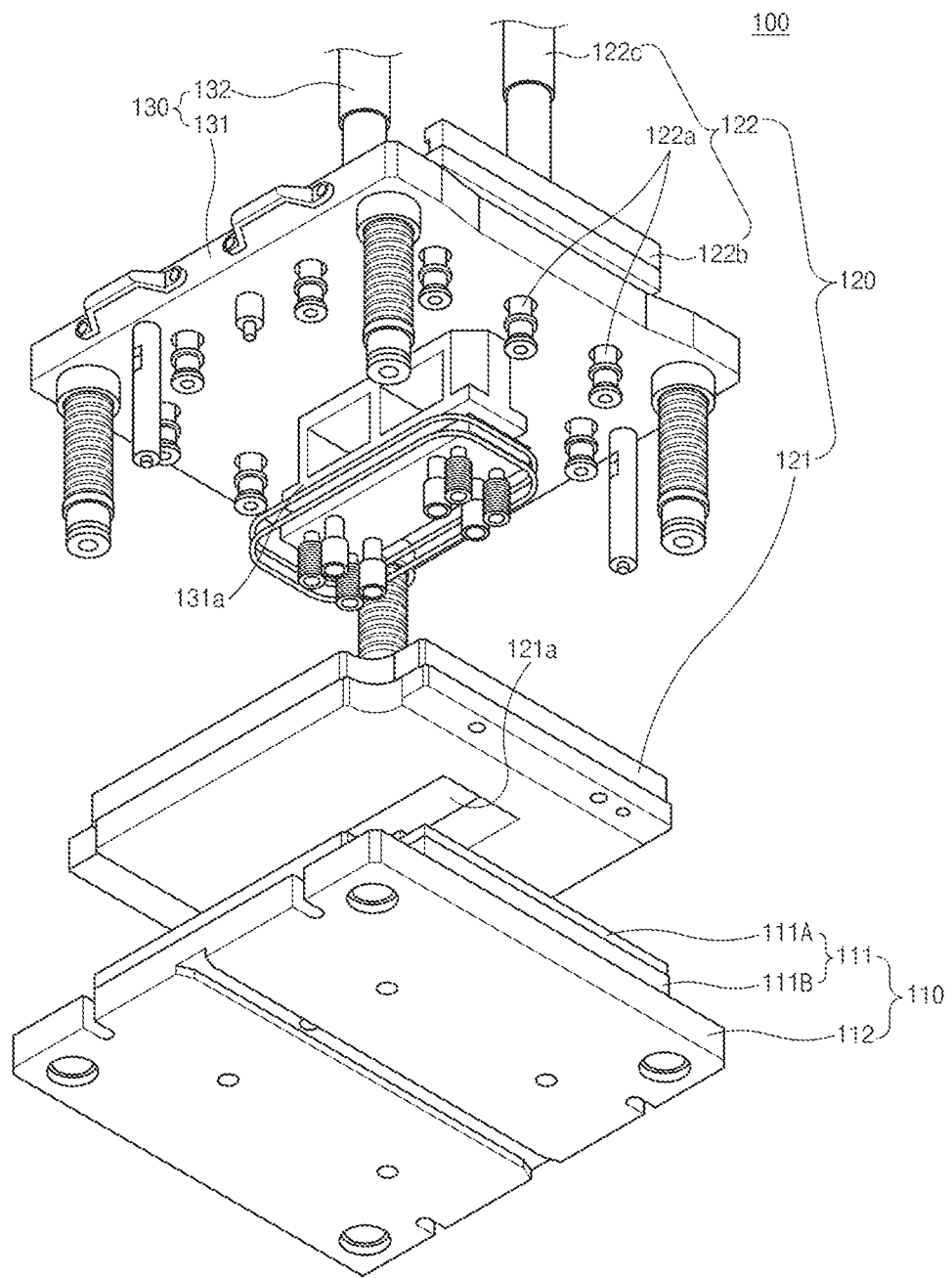
FIG. 2 is an exploded perspective view of the pouch forming device according to the first exemplary embodiment of the present invention.
Figure 3:
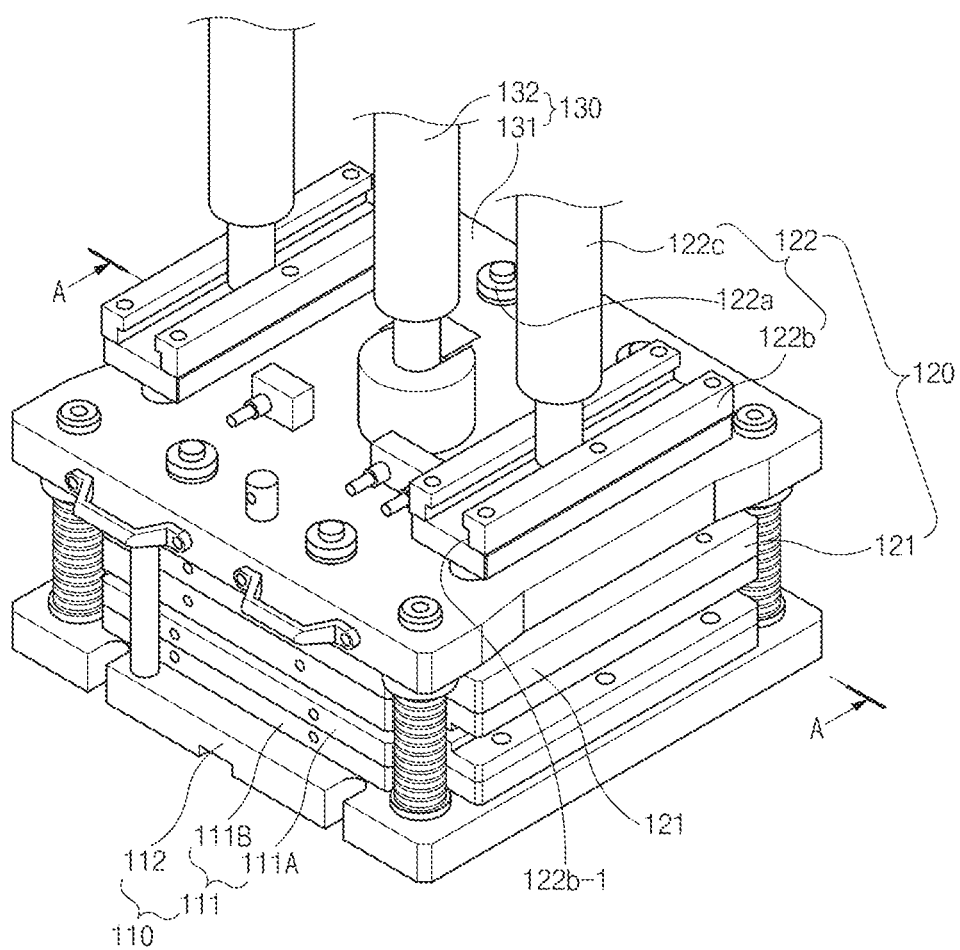
FIG. 3 is an assembled perspective view of the pouch forming device according to the first exemplary embodiment of the present invention.
Figure 4:
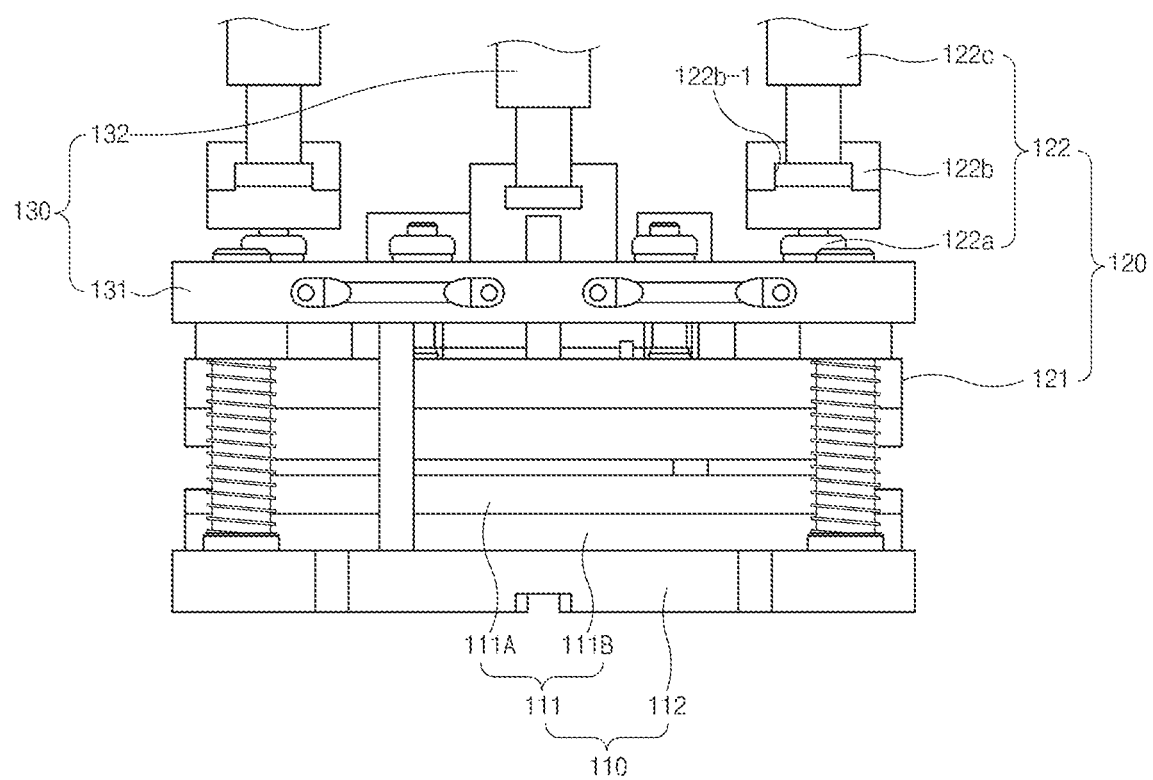
FIG. 4 is a front view of the pouch forming device according to the first exemplary embodiment of the present invention.
Figure 5:
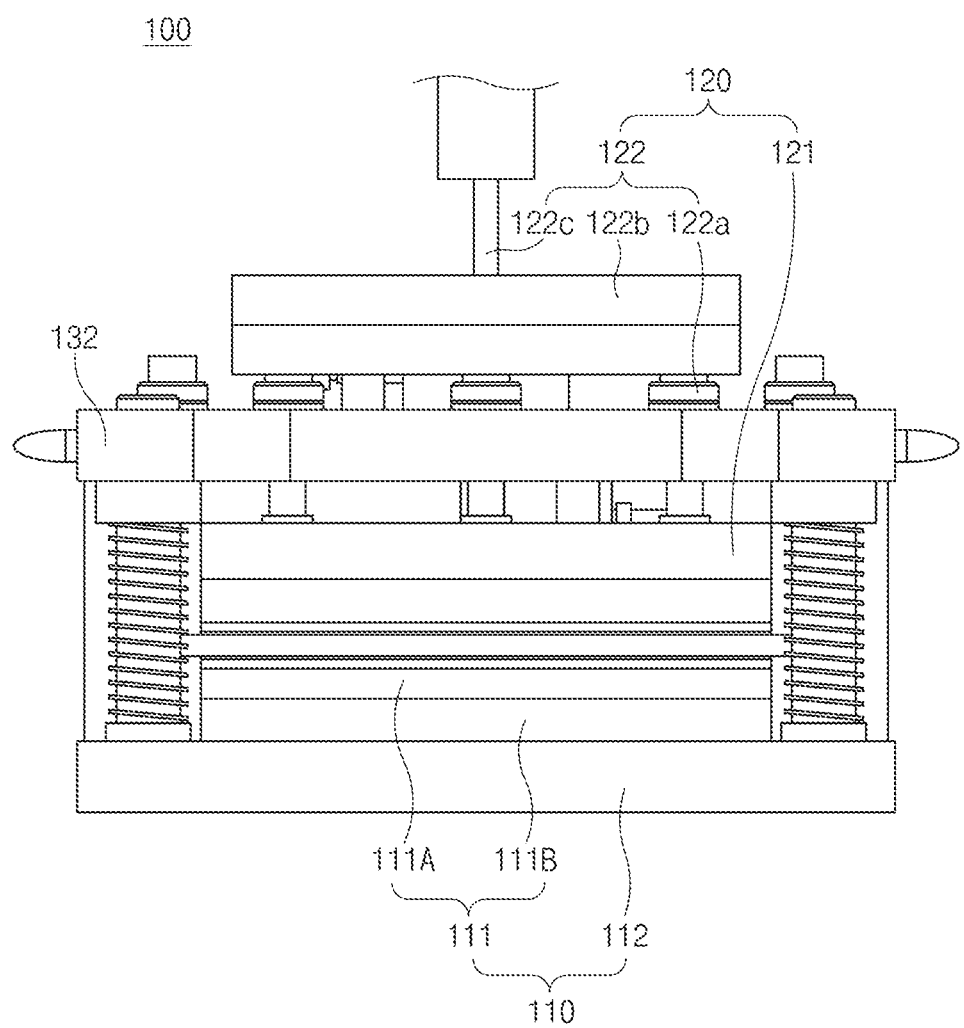
FIG. 5 is a side view of the pouch forming device according to the first exemplary embodiment of the present invention.
Figure 6:
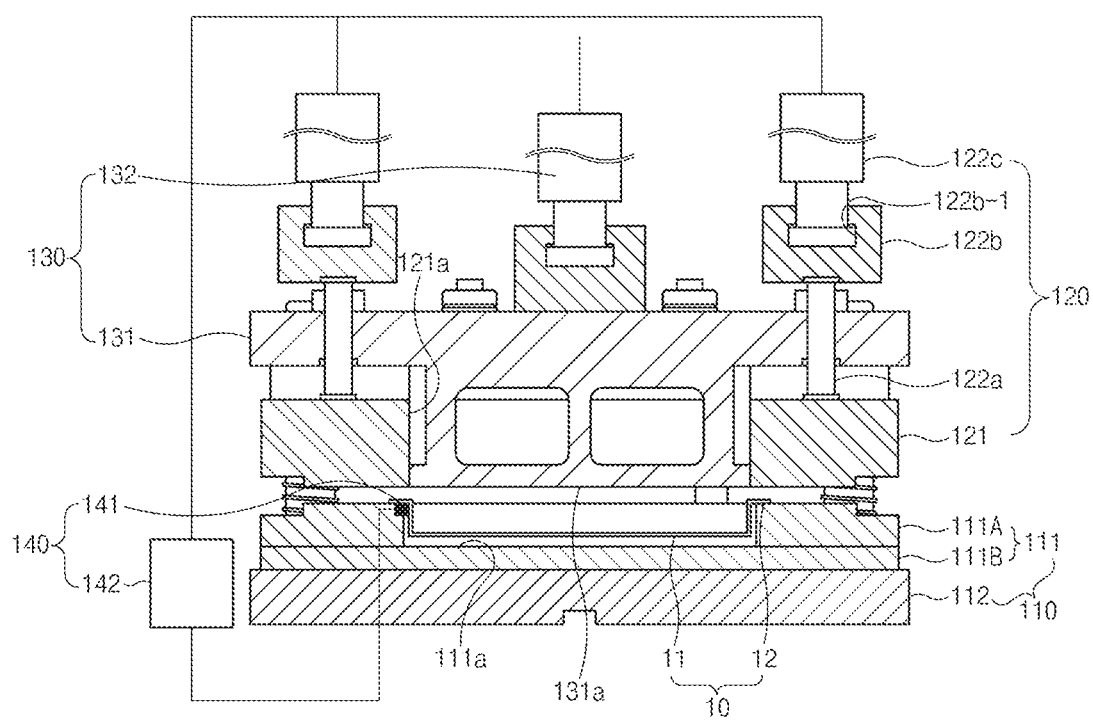
FIG. 6 is a cross-sectional view taken along line A-A of FIG. 3 according to the first exemplary embodiment of the present invention.

As illustrated in FIG. 2, the die member 110 is configured to dispose the pouch film 10 thereon. The die member 110 may comprise a die 111 on which the pouch film 10 is disposed and a die holder 112 to which the die 111 is fixed. The die 111 may have an area less than an area of the die holder 112. A forming part 111a for forming the electrode assembly accommodation part in the pouch film 10 may be formed in a top surface of the die 111.

The die 111 may comprise an upper die (e.g., a top die) 111A and a lower die (e.g., a bottom die) 111B, which are vertically stacked. The upper die 111A may include a forming part 111a, which vertically passes through the upper die 111A in a top surface thereof, and the lower die 111B may be disposed under the upper die 111A to close a lower portion of the forming part 111a. In the die 111 having the above-described structure, a plurality of upper dies 111A, in which the forming parts are formed in various sizes, shapes, and thicknesses, may be substituted and used with the lower die 111B to enhance compatibility.

Stripper Member

The stripper member 120 is configured to fix the pouch film disposed on the die member. The stripper member 120 may comprise a stripper 121 disposed to be vertically movable on an upper portion of the die member 110, pressing the pouch film 10 to fix the pouch film 10 disposed on the die 111 when descending. The stripper member 120 may further comprise a first driving piece 122 that moves the stripper 121 vertically.

The stripper 121 may have a size that corresponds to a size of the top surface of the die 111. An aperture 121a that vertically passes through the stripper 121 and has a substantially same size as the forming part 111a may be formed in a top surface of the stripper 121. The first driving piece 122 may comprise a plurality of moving rods 122a that allow the stripper 121 to vertically move, a connection bar 122b that allows the plurality of moving rods 122a to vertically move simultaneously, and a cylinder 122c that allows the connection bar 122b to vertically move.

The plurality of moving rods 122a may be uniformly connected to the stripper 121 along an edge of the top surface thereof to allow the stripper 121 to vertically descend or ascend with respect to the die 110. Particularly, the plurality of moving rods 122a may pass through a top surface of a punch plate of the punch member 130 and may be connected to the stripper 121. Thus, the moving rods 122a may vertically move through the punch plate to allow the stripper 121 to vertically descend or ascend more stably.

The connection bar 122b is configured to allow the plurality of moving rods 122a to move simultaneously and synchronously. The connection bar 122b has a long rectangular shape, and the plurality of moving rods 122a may be connected to a bottom surface of the connection bar 122b. A guide groove 122b-1 may be formed in a top surface of the connection bar 122b in a longitudinal direction, and the cylinder 122c may be connected to the guide groove 122b-1 to be adjustable in position. Accordingly, even when a positional discrepancy occurs between the cylinder 122c and the connection bar 122b, the cylinder 122c may be stably connected to the connection bar 122b.

In the stripper member 120 having the above-described structure, when the connection bar 122b descends through the cylinder 122c, the stripper member 120 may be interlocked with the connection bar 122b to allow the plurality of moving rods 122a to descend. Thus, while the stripper 121 descends due to the plurality of moving rods 122a, the stripper 121 may press and fix the edge surface of the pouch film 10 disposed on the die 111 simultaneously.

Punch Member

The punch member 130 may comprise a punch plate 131 that includes a punch 131a disposed to be vertically movable on the upper portion of the die member 110 and inserted into the forming part 111a when descending to form the electrode assembly accommodation part. The punch member 130 may further include a second driving piece 132 that moves the punch plate 131 vertically.

In the punch member 130 having the above-described structure, when the punch plate 131 descends due to the second driving piece 132, the punch 131a provided on the punch plate 131 may pass through the aperture of the stripper 121 and be subsequently inserted into the forming part 111a. The punch 131a may be inserted into the forming part 111a while pressing the pouch film 10 disposed on the forming part 111a to form the electrode assembly accommodation part having the form of the forming part in the pouch film 10.

Control Member

The control member 140 may control the first driving piece to allow the stripper to ascend to decrease the pressing force applied to the pouch film when the punch is inserted into the forming part to press the pouch film. In particular, the control member 140 may reduce the pressing force applied to the edge surface of the pouch film 10 to induce a portion of the edge surface of the pouch film 10 to be inserted into the forming part 111a along with the punch 131a. Thus, the elongation of the electrode assembly accommodation part 11 formed in the pouch film 10 may be increased, and therefore, the electrode assembly accommodation part 11 may be formed without occurrence of cracks.

In implementations, the control member 140 may comprise a sensor 141 that detects the insertion of the punch 131a into the forming part 111a and a controller 142 that controls the first driving piece 122 based on a signal of the sensor 141 to allow the stripper 121 to gradually ascend and gradually decrease the pressing force applied to the pouch film 10 disposed on the die 111. In other words, in the control member 140, when the punch 131a is inserted into the forming part 111a, the sensor 141 may detect the insertion of the punch 131a to transmit a signal to the controller 142, and the controller 142 may allow the first driving piece 122 to gradually ascend in response to the signal transmitted from the sensor 141. Subsequently, while the stripper 121 gradually ascends by being interlocked with the first driving piece 122, the pressing force applied to the pouch film 10 disposed on the die 111 may gradually decrease. As a result, a portion of the edge surface of the pouch film 10 pressed by the stripper 121 may move by the pressing force of the punch 131a in the direction of the forming part 111a to enhance the elongation. Thus, the electrode assembly accommodation part 11 may be formed in the pouch film 10 more stably without the occurrence of cracks.

In other words, as the pressing force of the punch 131a that presses the pouch film 10 increases, the pressing force of the stripper 121 that fixes the pouch film 10 may decrease. Accordingly, the elongation of the electrode assembly accommodation part of the pouch film 10 may be increased to prevent the cracks from occurring when the electrode assembly accommodation part is formed in the pouch film. The control member 140 may gradually reduce the pressing force of the stripper 121. Thus, a quality problem caused by excessive movement of the edge surface of the pouch film 10 or a quality problem caused by small moving force may be solved. In particular, the edge surface of the pouch film may uniformly move and be uniformly elongated to improve the quality of the electrode assembly accommodation part.

The control member 140 may allow the stripper 121 to ascend to be separated from the pouch film 10 when the punch 131a is completely inserted into the forming part 111a to remove the pressing force applied to the pouch film 10. The punch 131a being completely inserted into the forming part 111a may refer to a state that a bottom end of the punch 131a abuts a bottom surface of the forming part 111a or the punch 131a is at its lowest position in the reciprocal cycle. Thus, the elongation of the edge and vertex portion of the electrode assembly accommodation part formed in the pouch film may be maximized to prevent the cracks from occurring. Particularly, since the stripper 121 is separated from the pouch film 10, a separate process for the ascending the stripper 121 may be eliminated to achieve process simplification.

When the punch 131a is inserted into the forming part 111a to press the pouch film 10, the control member 140 may further control the second driving piece 132 to reduce a descending speed of the punch plate 131 on which the pouch 131a is disposed. Particularly, the control member 140 may control the second driving piece 132 to gradually reduce the descending speed of the punch plate 131 on which the punch 131a is disposed. Thus, the pressing force (or a rate of stretching) applied to the pouch film 10 by the punch 131a may be gradually decreased, and thus, the pouch film 10 may be gradually elongated to allow the electrode assembly accommodation part to be formed in the pouch film more stably without the occurrence of cracks.

Particularly, since the punch 131a is inserted into the forming part 111a, the control member 140 may control both the first driving piece 122 and the second driving piece 132 to cause the stripper to gradually ascend, and simultaneously, the descending speed of the punch plate to gradually decrease. Thus, the pouch film may be gradually elongated to form the electrode assembly accommodation part in the pouch film more stably without the occurrence of cracks.

Thus, in the pouch forming device 100 according to the first exemplary embodiment of the present invention, when the punch is inserted into the forming part, the stripper 121 may gradually ascend. As a result, the pressing force applied to the pouch film 10 fixed by the stripper may gradually decrease to gradually increase the elongation of the pouch film 10. Therefore, the electrode assembly accommodation part formed in the pouch film may be stably formed without the occurrence of cracks.

Referring to FIG. 1, the pouch forming device 100 according to the first exemplary embodiment of the present invention may further comprise a body member (e.g., a frame) 150. The body member 150 may comprise a lower body 151 and an upper body 152 which is disposed on the lower body 151 and on which the die member 110, the stripper member 120, the punch member 130, and the control member 140 are installed. In other words, the pouch forming device 100 according to the first exemplary embodiment of the present invention may stably install the die member 110, the stripper member 120, the punch member 130, and the control member 140 onto the body member 150.

Hereinafter, a forming method using the pouch forming device 100 according to the first exemplary embodiment of the present invention will be described.

[Pouch Forming Method According to First Exemplary Embodiment of the Present Invention]

Figure 7:
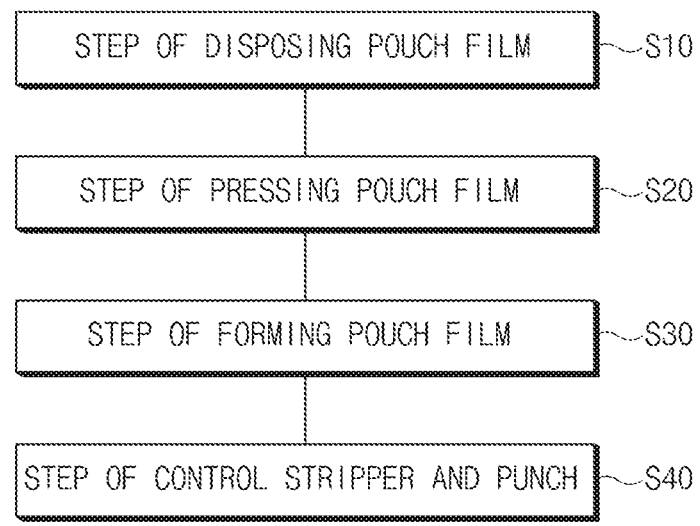
FIG. 7 is a flowchart illustrating a pouch forming method according to the first exemplary embodiment of the present invention.

As illustrated in FIG. 7, a pouch forming method according to the first exemplary embodiment of the present invention may comprise a disposition step (S10) of disposing a pouch film 10 on a top surface of a die member 110 provided with a forming part, a pressing step (S20) of pressing the pouch film 10 disposed on the top surface of the die member 110 with a stripper member 120 to fix an edge surface of the pouch film 10, a forming step (S30) of inserting a punch into the forming part to form an electrode assembly accommodation part in a surface of the pouch film 10, and a control step (S40) of gradually reducing a pressing force of the stripper member 120 to gradually decrease the pressing force applied to the pouch film when the punch is inserted into the forming part to press the pouch film.

In the disposition step (S10), the pouch film 10 may be disposed on the top surface of the die member 110. In particular, the die member 110 may comprise a die 111 in which the forming part 111a is formed and a die holder 112 that fixes the die 111. The pouch film 10 may be disposed on the top surface of the die 111 in which the forming part 111a is formed.

In the pressing step (S20), the stripper member 120 may press and fix the pouch film disposed on the die 111. In particular, the stripper member 120 may comprise a stripper 121 and a first driving piece 122. While the stripper 121 descends due to the first driving piece 122, the stripper 121 may press and fix an edge surface of the pouch film 10 disposed on the die 111.

In the punch step (S30), the punch member 130 may press the pouch film 10 disposed on the forming part 111a to form the electrode assembly accommodation part. The punch member 130 may comprise a punch plate 131 provided with the punch 131a and a second driving piece 132. In particular, in the punch member 130, when the punch plate 131 descends due to the second driving piece 132, the punch 131a provided on the punch plate 131 may be inserted into the forming part 111a while pressing the pouch film 10 to form the electrode assembly accommodation part in the pouch film 10.

The control step (S40) may comprise a first control process of outputting an insertion signal when the punch 131a is inserted into the forming part and a second control process of gradually reducing the pressing force applied to the pouch film when the insertion signal is outputted. Further, the control member 140 may comprise a sensor 141 and a controller 142. In the first control process, when the punch 131a is inserted into the forming part 111a while pressing the pouch film 10, the sensor 141 may detect the insertion of the punch 131a to transmit the insertion signal to the controller 142. In the second control process, when the controller 142 receives the insertion signal of the sensor 141, the first driving piece 122 may be controlled to allow the stripper 121 to gradually ascend. Thus, the pressing force applied to the pouch film 10 fixed to the stripper 121 may gradually decrease, and a portion of the edge surface of the pouch film 10 may be gradually elongated in a direction of the forming part by the pressing force of the punch 131a to enhance elongation. Therefore, the electrode assembly to be formed in the pouch film 10 may be stably formed without an occurrence of cracks.

Particularly, when the punch 131a is completely inserted into the forming part 111a, the control member 140 may remove the pressing force applied to the pouch film 10 by the stripper 121. The punch 131a being completely inserted into the forming part 111a may refer to a state that a bottom end of the punch 131a abuts a bottom surface of the forming part 111a or the punch 131a is at its lowest position in the reciprocal cycle. Thus, the elongation of the pouch film while the punch 131a is completely inserted into the forming part may be maximized to prevent the cracks from occurring at an edge and a vertex of the electrode assembly accommodation part formed in the pouch film 10.

The control step (S40) may further comprise a third control process of gradually reducing a descending speed of the punch when the insertion signal is outputted by the control member 140 to gradually decrease the pressing force (or a stretching rate) applied to the pouch film by the punch. In the third control process, the second driving piece 132 may be controlled by the controller 142 to gradually decrease the descending speed of the punch plate 131. Thus, the punch 131a, along with the punch plate 131, may gradually decrease the descending speed to gradually decrease the pressing force applied to the pouch film 10 disposed on the forming part. As a result, the pouch film 10 may be gradually formed into the electrode assembly accommodation part 11 without the occurrence of cracks.

Figure 8:
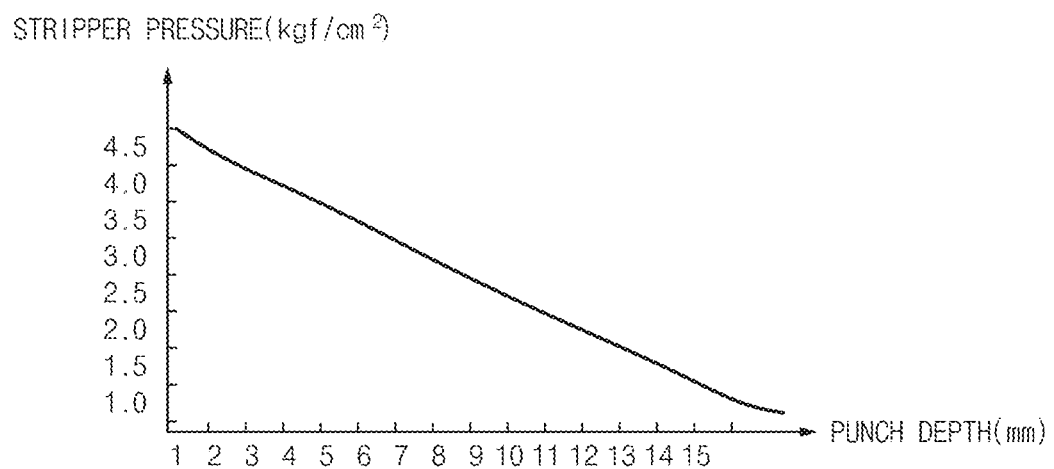
FIG. 8 is a graph illustrating a relationship between a pressing force of a stripper member and a forming depth in the pouch forming method according to the first exemplary embodiment of the present invention.

In summary, as shown in the graph of FIG. 8, in the second control process, the pressing force of the stripper 121 and a depth at which the punch 131a is inserted into the forming part 111a may be inversely proportional to each other. In other words, as the depth of the punch 131a inserted into the forming part 111a increases, the pressing force of the stripper 121 may gradually decrease to expand an elongation area of the pouch film. As a result, a local elongation of the pouch may increase to prevent the cracks from occurring.

Figure 9:
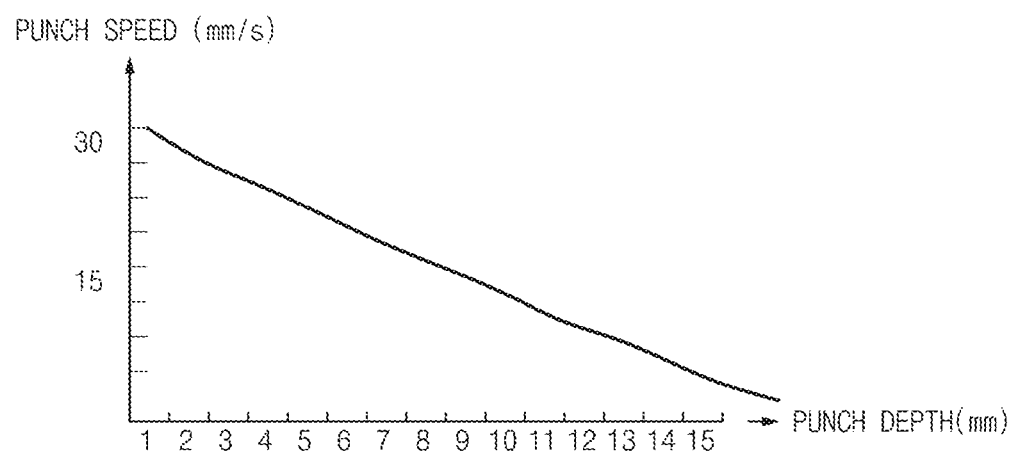
FIG. 9 is a graph illustrating a relationship between a descending speed of a punch member and a forming depth in the pouch forming method according to the first exemplary embodiment of the present invention.

In addition, as illustrated in FIG. 9, in the third control process, the descending speed of the punch 131a and the depth of the punch 131a inserted into the forming part 111a may be inversely proportional to each other. In other words, as the depth of the punch 131a inserted into the forming part 111a increases, the descending speed, i.e., the pressing force of the punch 131a, may gradually decrease to expand the elongation area of the pouch film. As a result, a local elongation of the pouch may increase to prevent the cracks from occurring.

Thus, in the pouch forming method according to the first exemplary embodiment of the present invention, when the pouch film is formed, the elongation may gradually increase to form the electrode assembly accommodation part in the pouch film without the occurrence of cracks, thereby enabling the pouch to be manufactured with an improved quality.

[Facility for Producing Secondary Battery According to Second Exemplary Embodiment of the Present Invention]

A facility for producing a secondary battery according to a second exemplary embodiment of the present invention may comprise the pouch forming device according to the foregoing first exemplary embodiment. In particular, referring to FIGS. 1 and 10, the facility for producing secondary battery according to the second exemplary embodiment of the present invention may comprise a pouch forming device that forms a pouch 10A and a sealing device 200 that seals an edge surface of the pouch 10A while accommodating an electrode assembly 20 in the pouch 10A to produce a secondary battery 1.

The pouch forming device 100 may comprise a die member on which a pouch film is disposed, a stripper member that presses and fixes the pouch film disposed on the die member, a punch member that forms the pouch film disposed on the die member to form an electrode assembly accommodation part, and a control member that reduces the pressing force of the stripper member when the punch member performs the forming to increase the elongation of the pouch film and to prevent cracks from occurring.

The pouch forming device 100 may include the same configuration and function as the pouch forming device according to the foregoing first exemplary embodiment, and thus, its detailed description will be omitted. Thus, the facility for producing the secondary battery according to the second exemplary embodiment of the present invention may produce the secondary battery having an improved quality.

[Pouch Forming Device According to Third Exemplary Embodiment of the Present Invention]

A pouch forming device according to a third exemplary embodiment of the present invention may comprise a die member on which a pouch film is disposed, a stripper member that presses and fixes the pouch film disposed on the die member, and a punch member that forms the pouch film disposed on the die member to form an electrode assembly accommodation part. The punch member may comprise a punch plate comprising a punch disposed to be vertically movable on an upper portion of the die member and configured to be inserted into the forming part when descending to form the electrode assembly accommodation part in the pouch film, and a second driving piece that allows the punch plate to vertically move.

The pouch forming device according to the third exemplary embodiment of the present invention may further comprise a control member that controls the second driving piece to reduce a descending speed of the punch plate provided with the punch when the punch is inserted into the forming part to press the pouch film. Thus, the descending speed of the punch may be adjusted to gradually decrease the pressing force applied to the pouch film. Therefore, the pouch film may be gradually elongated to prevent cracks from occurring.

[Experimental Example]
Comparative Example

In Comparative Example, an electrode assembly accommodation is formed in a pouch film using a pouch forming device comprising a die member, a stripper member, and a punch member. In other words, the pouch film is formed using a pouch forming device having the constituents of the pouch forming device according to the first exemplary embodiment of the present invention except the control member.

Manufacturing Example

In Manufacturing Example, an electrode assembly accommodation is formed in a pouch film using a pouch forming device comprising a die member, a stripper member, a punch member, and a control member. In other words, the pouch film is formed using a pouch forming device having all of the constituents of the pouch forming device according to the first exemplary embodiment of the present invention.

In Comparative Example and Manufacturing Example, the same pouch film is used, and the pouch film is formed under the same environment. The same environment may refer to a vacuum level: −98 kPa, a pressure of the stripper member: 4 kg/cm$^2$, an initial descending speed of the punch member: 30 mm/s, a pressure inverse proportion control rate: 95%, and a surface roughness of the punch: 0.1 s.

Elongation

The table in FIG. 11 is obtained as a result of measuring whether the pouch films formed according to Comparative Example and Manufacturing Example are defective. Referring to the results in the table of FIG. 11, in Comparative Example, cracks occur in the pouch film when the punch descends by 7 mm or more from the uppermost end of the forming part of the die. On the other hand, in Manufacturing Example, cracks occur in the pouch film when the punch descends by 10 mm or more from the uppermost end of the forming part of the die.

In summary, in Manufacturing Example, the cracks occur after punch descends by 3 mm more than in Comparative Example. From the results of the above experiments, in Manufacturing Example, it is confirmed that the elongation can be increased more than in Comparative Example.

Illustrations of Cracks

In Comparative Example and Manufacturing Example, FIGS. 12 and 13 show illustrations of the pouch formed in the state in which the punch descends by 7 mm from the uppermost end of the forming part of the die. As illustrated in FIG. 12, in the pouch 10A manufactured by Comparative Example comprising the electrode assembly accommodation part 11 and the sealing part 12, cracks occur in the vertex of the electrode assembly accommodation part 11. As illustrated in FIG. 13, in the pouch 10A manufactured by Manufacturing Example comprising the electrode assembly accommodation part 11 and the sealing part 12, the electrode assembly accommodation part 11 is formed to the vertex without the occurrence of cracks.

Thus, from the results of the above experiments, it is confirmed that the pouch forming device according to Manufacturing Example of the present invention increases the elongation in comparison to the elongation of the pouch forming device according to Comparative Example. Therefore, the electrode assembly accommodation part may be formed without the occurrence of cracks.

According to the present invention, the pouch forming device may comprise the die member, the stripper member, the punch member, and the control member. In particular, when the pouch is formed, the stripper may gradually decrease the pressing force, and/or the punch member may gradually decrease the descending speed. Thus, when the pouch is formed, the elongation may gradually increase, and thus, the pouch may be stably formed. Particularly, when the pouch is formed, the extreme ends, e.g., the edge or vertex portion, of the electrode assembly accommodation part formed in the pouch may be prevented from cracking.

The scope of the present invention is defined by the appended claims rather than the foregoing description and the exemplary embodiments described therein. Various modifications made within the meaning of equivalents of the claims of the invention and within the claims are to be regarded to be in the scope of the present invention.

What is claimed is:

1. A pouch forming device comprising:
   a die member including a die on which a pouch film is disposed on a top surface thereof, in which a forming part is formed, and a die holder to which the die is fixed;
   a stripper member including a stripper disposed on an upper portion of the die member to be vertically movable to press and fix the pouch film disposed on the die when descending and a first driving piece to move the stripper vertically;
   a punch member including a punch plate comprising a punch disposed on the upper portion of the die member to be vertically movable and configured to be inserted into the forming part when descending to form an electrode assembly accommodation part in the pouch film and a second driving piece to move the punch plate vertically; and
   a control member that controls the first driving piece to allow the stripper to ascend when the punch is inserted into the forming part to press the pouch film to decrease a pressing force applied to the pouch film,
   wherein the control member controls the first driving piece to allow the stripper to gradually ascend to gradually decrease the pressing force applied to the pouch film.

2. The pouch forming device of claim 1, wherein the control member allows the stripper to ascend to be separated from the pouch film when the punch is completely inserted into the forming part to remove the pressing force applied to the pouch film.

3. The pouch forming device of claim 1, wherein the control member comprises a sensor that detects insertion of the punch into the forming part and a controller that controls the first driving piece in response to a signal from the sensor to allow the stripper to gradually ascend.

4. The pouch forming device of claim 1, wherein the first driving piece comprises:
   a plurality of moving rods connected to the stripper by passing through a top surface of the punch plate to allow the stripper to vertically move;
   a connection bar to which the plurality of moving rods disposed on an upper portion of the punch plate are fixed, wherein the connection bar allows the plurality of moving rods to vertically move simultaneously; and
   a cylinder that allows the connection bar to vertically move.

5. The pouch forming device of claim 2, wherein the control member further controls the second driving piece to reduce a descending speed of the punch plate on which the punch is disposed when the punch is inserted into the forming part to press the pouch film.

6. The pouch forming device of claim 5, wherein the control member controls the second driving piece to gradually decrease the descending speed of the punch plate on which the punch is disposed.

7. The pouch forming device of claim 6, wherein the control member controls the first driving piece and the second driving piece simultaneously to allow the stripper to gradually ascend and the descending speed of the punch plate to gradually decrease.

8. A pouch forming device comprising:
- a die member including a die on which a pouch film is disposed on a top surface thereof, in which a forming part is formed, and a die holder to which the die is fixed;
- a stripper member including a stripper disposed on an upper portion of the die member to be vertically movable to press and fix the pouch film disposed on the die when descending and a first driving piece to move the stripper vertically;
- a punch member including a punch plate comprising a punch disposed on the upper portion of the die member to be vertically movable and configured to be inserted into the forming part when descending to form an electrode assembly accommodation part in the pouch film and a second driving piece to move the punch plate vertically; and
- a control member that controls the second driving piece to reduce a descending speed of the punch plate on which the punch is disposed when the punch is inserted into the forming part to press the pouch film, wherein the control member controls the second driving piece to gradually reduce the descending speed of the punch plate on which the punch is disposed.

9. A pouch forming method comprising:
- a disposition step of disposing a pouch film on a top surface of a die member including a forming part;
- a pressing step of pressing the pouch film disposed on the top surface of the die member with a stripper member to fix an edge surface of the pouch film;
- a forming step of inserting a punch into the forming part to form an electrode assembly accommodation part in a surface of the pouch film; and
- a control step of gradually reducing a pressing force of the stripper member to gradually decrease the pressing force applied to the pouch film when the punch is inserted into the forming part to press the pouch film, wherein the control step comprises a first control process of outputting an insertion signal when the punch is inserted into the forming part and a second control process of gradually reducing the pressing force applied to the pouch film when the insertion signal is outputted.

10. The pouch forming method of claim 9, wherein the control step further comprises a third control process of gradually reducing a descending speed of the punch when the insertion signal is outputted to gradually decrease the pressing force applied to the pouch film by the punch.

* * * * *